(12) United States Patent
Tishkevich (10) Patent No.: US 10,769,698 B2
(45) Date of Patent: Sep. 8, 2020

(54) METHOD FOR SHARING INFORMATION AND POSITIVE RATINGS OF PRODUCTS, SERVICES, INDIVIDUALS AND ORGANIZATIONS IN A SOCIAL NETWORK

(71) Applicant: LOGIX FUSION, INC., Bellevue, WA (US)

(72) Inventor: Oleg V. Tishkevich, Bellevue, WA (US)

(73) Assignee: Logix Fusion, Inc., Bellevue, WA (US)

( * ) Notice: Subject to any disclaimer, the term of this patent is extended or adjusted under 35 U.S.C. 154(b) by 958 days.

(21) Appl. No.: 14/507,827

(22) Filed: Oct. 6, 2014

(65) Prior Publication Data
US 2015/0088685 A1  Mar. 26, 2015

Related U.S. Application Data (63) Continuation of application No. 13/383,125, filed as application No. PCT/US2010/041235 on Jul. 7, 2010, now abandoned.

(Continued)

(51) Int. Cl.
*G06Q 10/10* (2012.01)
*G06Q 10/06* (2012.01)
(Continued)

(52) U.S. Cl.
CPC ......... *G06Q 30/0631* (2013.01); *G06Q 30/02* (2013.01); *G06Q 30/0269* (2013.01);
(Continued)

(58) Field of Classification Search
CPC .... G06Q 50/01; G06Q 30/0282; G06Q 30/02; G06Q 30/0269; G06Q 30/0625; G06Q 30/0631; G06Q 30/0641
(Continued)

(56) References Cited

U.S. PATENT DOCUMENTS 7,319,976 B1  1/2008  Peckover
7,778,890 B1*  8/2010  Bezos .................... G06Q 10/10
                                                                 705/26.1
(Continued)

OTHER PUBLICATIONS

International Search Report dated Oct. 26, 2010, for International Application No. PCT/US2010/041235, 3 pages
(Continued)

*Primary Examiner* — Jonathan P Ouellette
(74) *Attorney, Agent, or Firm* — Carrie M. Stroup (57) ABSTRACT

Each user of the social network is prompted to list their favorite products (i.e., cell phones, computers, movies, cars, groceries, and others), services (i.e., accounting, carpet cleaning, legal, medical, landscaping, and others), people (i.e., celebrities, executives, consultants, specialist, and other people), and organizations (any business, non-profit organizations, and others). The data is then available for the member and other associated members to view and search. Members are allowed to only list items with positive ratings. Search results are organized based on the Search Criteria specified. The System is also utilizing a generic hardware/software interface that enables communication of the information directly from the place of business (Retail Store Interface).

26 Claims, 5 Drawing Sheets

Related U.S. Application Data (60) Provisional application No. 61/223,658, filed on Jul. 7, 2009.

(51) Int. Cl.
*G06Q 30/06* (2012.01)
*G06Q 30/02* (2012.01)
*G06Q 50/00* (2012.01)

(52) U.S. Cl.
CPC ..... *G06Q 30/0625* (2013.01); *G06Q 30/0641* (2013.01); *G06Q 50/01* (2013.01)

(58) Field of Classification Search
USPC .................................................. 705/1.1–912
See application file for complete search history.

(56) References Cited

U.S. PATENT DOCUMENTS

| | | | |
|---|---|---|---|
| 8,095,432 B1 * | 1/2012 | Berman | G06Q 30/0631 705/26.7 |
| 9,009,082 B1 * | 4/2015 | Marshall | G06Q 99/00 705/26.1 |
| 2002/0038221 A1 | 3/2002 | Tiwary et al. | |
| 2003/0028451 A1 | 2/2003 | Ananian | |
| 2005/0159998 A1 | 7/2005 | Buyukkokten et al. | |
| 2005/0234781 A1 * | 10/2005 | Morgenstern | G06Q 30/00 705/14.16 |
| 2006/0271460 A1 | 11/2006 | Hanif | |
| 2008/0228549 A1 | 9/2008 | Harrison | |
| 2009/0024451 A1 | 1/2009 | Maerz et al. | |
| 2009/0076920 A1 | 3/2009 | Feldman et al. | |
| 2009/0171760 A1 | 7/2009 | Aarnio et al. | |
| 2009/0292608 A1 | 11/2009 | Polachek | |
| 2010/0122174 A1 | 5/2010 | Snibbe et al. | |

OTHER PUBLICATIONS

Written Opinion dated Oct. 26, 2010, for International Application No. PCT/US2010/041235, 7 pages.

* cited by examiner

FIG. 1:
Registration/Authentication Flowchart

FIG. 5:
Business Registration/Authentication Flowchart

METHOD FOR SHARING INFORMATION AND POSITIVE RATINGS OF PRODUCTS, SERVICES, INDIVIDUALS AND ORGANIZATIONS IN A SOCIAL NETWORK

PRIORITY CLAIM

The present application is a continuation of and claims benefit to U.S. patent application Ser. No. 13/383,125, filed Mar. 23, 2012 which claims benefit to a national phase application filed pursuant to 35 U.S.C. § 371 of International Patent Application No. PCT/US2010/041235, filed Jul. 7, 2010; which application claims the benefit of U.S. Provisional Patent Application No. 61/223,658, filed Jul. 7, 2009, all of the foregoing applications are, incorporated herein by reference in their entireties.

TECHNICAL FIELD

Embodiments of this invention relate generally to social networking websites and other websites in which users can form connections with each other.

BACKGROUND

Social networks, or social utilities that track and enable connections between members (including people, businesses, and other entities), have become prevalent in recent years. In particular, social networking websites allow members to communicate information more efficiently. For example, a member may post contact information, background information, job information, hobbies, and/or other member-specific data to a location associated with the member on a social networking website. Other members can then review the posted data by browsing member profiles or searching for profiles including specific data. The social networking websites also allow members to associate themselves with other members, thus creating a web of connections among the members of the social networking website. These connections among the members can be exploited by the website to offer more relevant information to each member in view of the members' own stated interests in their connections.

Social networking websites typically incorporate a system for connecting members to content that is most likely to be relevant to each member. For example, members may be grouped according to one or more common attributes in their profiles, such as geographic location, employer, job type, age, music preferences, interests, or other attributes. Members of the social networking website or external parties can then use these groups to customize or target information delivery so that information that might be of particular interest to a group can be communicated to that group.

Many review sites or social networks sites sometimes make it difficult for consumers to make a decision about a product or service based on the feedback or reviews posted on those sites due to the fact that an item could have a positive as well as negative feedback or comments. Often a good product or service may get several positive reviews and just a few bad reviews from some unsatisfied customers may affect a decision of a person to purchase this product or service. In addition, customers who had a negative experience with the service or product are more likely to leave their negative feedback on those site rather than those who had a positive experience.

A user is more likely to make a decision on a product or service based on a trusted source who represents similar interests as the user rather than an average rating of opinions of people the user does not know or an opinion of some experts from a site which might be deriving advertising revenue from the products/services they review. In addition, even if the user considers the review of a specific business from one of those sites, the information may be outdated and no longer relevant as it is very difficult for any site to constantly have experts review every business out there.

There is a need for specifically addressing the issue of making a selection decision about a product or service based on a person's connections or on opinions of experts on the specific topic of search.

SUMMARY

Social Networking websites often contain overwhelming amounts of information that in many cases is not relevant or not of interest to a specific user. Embodiments of the present invention provide a single place on the Internet where users can keep reference of all things designated as "good" things (product/services, etc.), quickly lookup any specific item, and get a relevant recommendation.

Connecting to the best customers creates a great value and a word of mouth advertising opportunity for any business. The difference with embodiments of the present invention is that they allow, encourage and ultimately reward businesses to actively participate in building the network of their loyal customers and by not allowing any negative feedback provides the ultimate advertising opportunity for this type of reviews site.

Opportunity to organize search results based on connections with other users, age, occupation/position, "coolness", expert status and other parameters delivers a much more relevant and targeted recommendation on a product or service comparing to other sites. This information can also be provided as a service to businesses in a form of a market research.

The features and advantages described in this summary and the following detailed description are not all-inclusive. Many additional features and advantages will be apparent to one of ordinary skill in the art in view of the detailed description and claims hereof.

DETAILED DESCRIPTION

In the following description, certain details are set forth in conjunction with the described embodiments of the present invention to provide a sufficient understanding of the invention. One skilled in the art will appreciate, however, that the invention may be practiced without these particular details. Furthermore, one skilled in the art will appreciate that the example embodiments described below do not limit the scope of the present invention, and will also understand that various modifications, equivalents, and combinations of the disclosed embodiments and components of such embodiments are within the scope of the present invention. Embodiments including fewer than all the components of any of the respective described embodiments may also be within the scope of the present invention although not expressly described in detail below. Finally, the operation of well-known components and/or processes has not been shown or described in detail below to avoid unnecessarily obscuring the present invention.

Ratings and Comments

Many review sites or services could have a positive as well as a negative effect on the buying decision of a specific item or dealing with a specific business. Business might have hundreds of customers who really like their services or products, but often only those few unsatisfied customers leave a feedback or write a review. This may create an inadequate opinion about a specific business or an item on the Internet that does not correlate with an objective view or opinion about the item.

One embodiment of the present invention is a system that will only allow selecting a positive rating or comments for any of the items added to the website. Example item ratings are "good", "great", or "greatest". The number of ratings may, of course, vary, and other words may be used to specify the positive ratings as well.

Using this system the number of instances of positive feedback and ratings are the measuring factor in preferring one item or business to other. In addition, opinions of people within the user social network as well as experts in the specific area further facilitate the selection process based on a higher trust level of the information source.

For example a purchase recommendation can be generated when a user searches for a laptop to buy and the system returns a list of laptops that the user's friends and business contacts listed as their favorite. Another recommendation can be generated when the user is searching for a wine to buy and selects to only include favorite wines of the users who are designated as Wine Experts. Also, the user may get an idea on what video game to buy for a teenager by selecting a popularity filter "Cool" in the search and setting the Age criteria in the search to less than 15. A search would in this instance return all video games that other users who are designated as "Cool" and who are less than 15 years of age marked as "Cool". A user may also limit their search to a specific geographical location. For example, only items from the state of New York may be included in search results.

Sample Individual User Registration Process

Embodiments of the present invention may be used by individual consumers. Consumers are taken through an easy registration process that facilitates collection of the initial information about the user and prompts the user to enter some of their favorite items.

Figure 1:
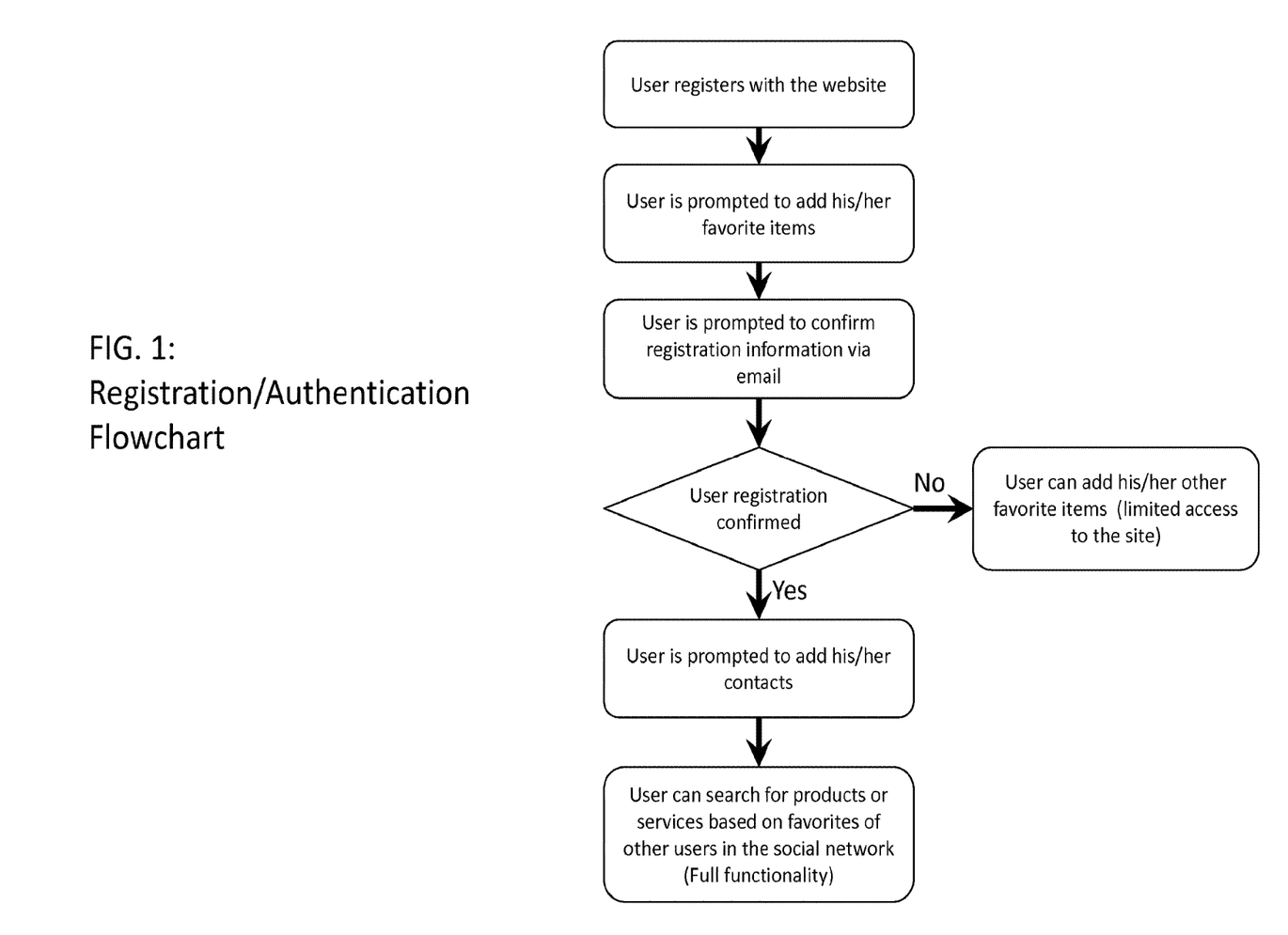
FIG. 1 is a sample individual user registration flowchart for the system website according to one embodiment of the invention.

FIG. 1 is a sample individual user registration flowchart for a website of the system described above according to one embodiment of the invention. The first action shown in the example of FIG. 1 example may require a user to enter some basic registration information like their first and last name, e-mail address, password, and age. Additional information about the user's profession/occupation, address, country of birth may be collected as well. This information may be used when processing various searches that the user performs to filter the results based on the specific Search Criteria. For example, a user might search for a landscaping service recommendation by limiting the results to only those submitted by other users who reside within 10 miles from the user's location.

After entering the initial registration information, a user is prompted to enter their favorite items. The items are added to a database and an e-mail is sent to confirm the user registration to the e-mail address the user provided. A user may open the received email and click the confirmation link, which would validate the user's email and give the user full access to all the functionality on the website. If the user does not confirm the email address provided during the registration process, only limited set of features may be available to the user on the website. After the confirmation of the email address, a user is prompted to add their contacts to the contact list such that he/she will be able to perform searches for products and services that the user's contacts have listed as their favorites.

System for Adding Favorite Items

Each item added to the system will be associated with categories and sub-categories. An item may belong to multiple categories and multiple sub-categories. In addition, the user has ability to assign Special Status or a Label to the item as well as set the Privacy Setting for the item to be viewed only by users with a specific User Relationship Role or Interest Group.

To make adding items to the system easier, the system will prompt a user to add several items grouped by category. These items and categories will be automatically selected by the system based on user's age, occupation, position/title and other data collected during the registration process. Categories selection criteria may consist of the items selected as favorite by other users of the website with similar profile information.

Figure 2:
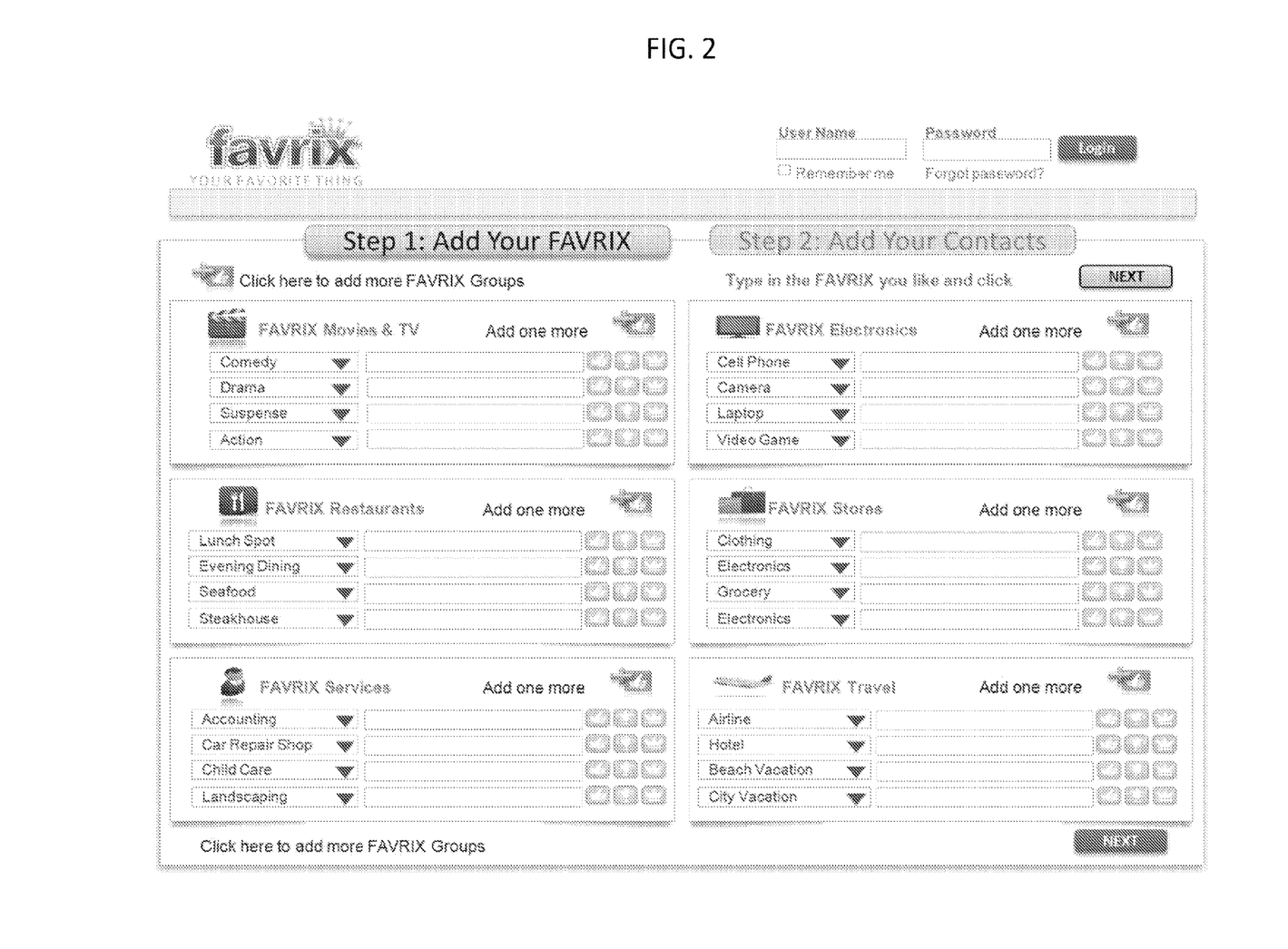
FIG. 2 is a sample screen of adding favorite items according to one embodiment of the invention.

FIG. 2 is a sample screen showing the addition of favorite items to the system according to one embodiment of the invention. In this screen, to add a favorite comedy movie, for example, a user would put the cursor in the top left section and start typing in the name of their favorite movie. Using the Data Provider interface, the system may display a list of suggestions based on the text the user is typing. If the desired movie appears in the list, the user may just select it without tying in the full name. By default the first icon to the right of the name of the item that represents a rating of "good" will be selected, but the user may click on "great" or "best" button to select the appropriate rating.

As a user types a favorite item into the corresponding field, a list of possible guesses/suggestions will appear such that user could pick from the list rather than typing the entire name of the item. This functionality is achieved by use of the technology similar to JQuery to quickly query information from a Data Provider.

Data Provider Interface

In this system the Data Provider can be an outside source or a web service or an internal database. The system utilizes the following implementations of data retrieval logic from the Data Provider of the JQuery information:

1) Internal Database Data Provider—a query is run on the System Database to return a limited number of first suggestions. Query can be run on multiple items including categories, sub-categories, products, services, contacts and other data elements stored in the System Database.

2) External Standard Data Provider—a standard web service interface (or an application API) will be offered to outside Data Providers to serve the data available in their systems to the dynamic search on the Website. This will allow companies with large number of items in the inventory to be easily searchable by the System and will provide a standard interface of searching information across multiple providers/businesses/organizations.

3) External Custom Data Provider—a custom interface built into the System to connect to outside Data Providers (i.e., yahoo.com, amazon.com, etc.) to serve the data available in their systems to the dynamic search on the Website.

The system may utilize either of the Data Providers or implement logic where if the results are not found in one Data Provider, it will automatically attempt a search from another Data Provider.

Privacy Settings

The system lets a user choose visibility of every item the user comments on and marks as a FAVRIX. The following options are examples of the privacy/visibility settings that can be used in the content of the embodiment of the invention:

1 1) Private—No other user will be able to see items marked Private except for the user who added the item. Items will not be accessible via search.

2) Business Contacts—only user's Business Contacts will only be able to see items that have Business visibility checked. The user's name will appear when the user's Business Contacts are searching for these items. No other user will see these items when looking up the user's profile.

3) Friends—Only members of the Friends role/group of the user will be able to see items that have Friends visibility checked. The user's name will appear when the user's Friends are searching for these items. No one else will see these items when looking up the user's profile.

4) People I know—Items marked with People I know visibility setting will only be shown to contacts that user added to the People I Know group. These items will not appear when members not listed on the user's contact list search for them.

5) Everyone—Items with "Everyone" visibility will show up in the search for all members. The name of the user who rated the item will appear to the user's Contact list. For other members the user's occupation/profession will be shown.

Special Statuses/Labels

The system will provide ability for users to achieve a special status which may give the user additional right to the extended functionality on the website. An example status achievement may be popularity when a minimum number of users associated with the given user on the social network mark that user with "Cool" or other popularity or characteristics label. Members that achieved the "Cool" status would for example be able to mark items they list as "Cool". "Cool" or other labeled items can be one of the criteria in an item search as well as be part of the sorting order for the search results. NOTE: Other popularity or enhanced designations labels can be used as well.

Another example of the Special Status/Label is an Expert status. A user can be named an "expert" in a specific area when a minimum number of users associated with that user on the social network accept the user's Expert status. For example, someone may be teacher by occupation and an expert in red wines. It would be valuable for other users to see that person's favorite wines when searching for that item. Next to the expert or any other status of the user the website will display the number representing the number of users associated with the user and who consider that person an expert in the particular field. Expert status is a Search Criteria and can be used in a search to filter favorite items of the users with a specific Expert status.

Gift Ideas

Favorite items added to the system can be marked by the user with the "I want it" or similar flag. This would indicate that the user does not currently have the item and would like to have it. This flag will be used in the Gift Idea feature of the system where the user can be notified of the friend's birthdays or other important dates and presented with the list of items that the friend marked as "I want it" to have an idea of a good birthday gift. Gift information presented can be supplied with the links on where to purchase these recommended items. Ads can be presented as well based on the recommendations provided in the Gift Idea feature.

"I have it" or similar label can be assigned to an item by the user which would allow user to list all the favorite and/or valuable items in their household. User may choose not to share this information with other users in the social network by setting the desired privacy setting for the item. "I want it" or "I have it" label can be also a Search Criteria. Users may filter search results by, for example, only showing items with "I want it" flag set to true.

Geographical Location

Items listed on the website may be associated with a specific geographical location. This will allow users to run a more detailed search where the sort and/or filter criteria may be the proximity to the chosen geographical location. For example, searching for a favorite seafood restaurant in 10 mile radius of the specific address, or searching for a real estate agent in Chicago.

User Relationship Roles

Users' contacts on the system can be grouped by three main user roles:
1) My Friends
2) My Business Contacts
3) People I know
4) Custom Groups "My Friends" is a user group that will has access to all of the favorite items (FAVRIX™) of the given user. For example, when a Friend of the user searches for a "laptop" and the user has a favorite laptop listed, the search will show the Friend the user's favorite laptop along with the username or actual name of the user.

"My Business Contacts" is a user group that has access to only those favorite items that the user listed under the "Business" group. In this case if the Business Contact of the user is searching for a favorite movie and that FAVRIX™ was not marked to be shown to Business Contact, the user's name will not be displayed in the search, but only user's occupation. If the Business Contact would search for "accountant" and the user has a favorite accounted listed, that FAVRIX™ will appear and the user's name will be displays next to that search result.

"People I know" is a user group that has access to only public favorite items of the user. For example, if the user from the People I know group searches for "seafood restaurant" and the user has a seafood restaurant listed as a public item, the user's name will appear next to the that FAVRIX™ in the search that person from the People I Know group performed.

In all other searches initiated by any user on the system outside of the given user network only the user's occupation information will be shown next to the item found and the user's identity will not be revealed.

Figure 3:
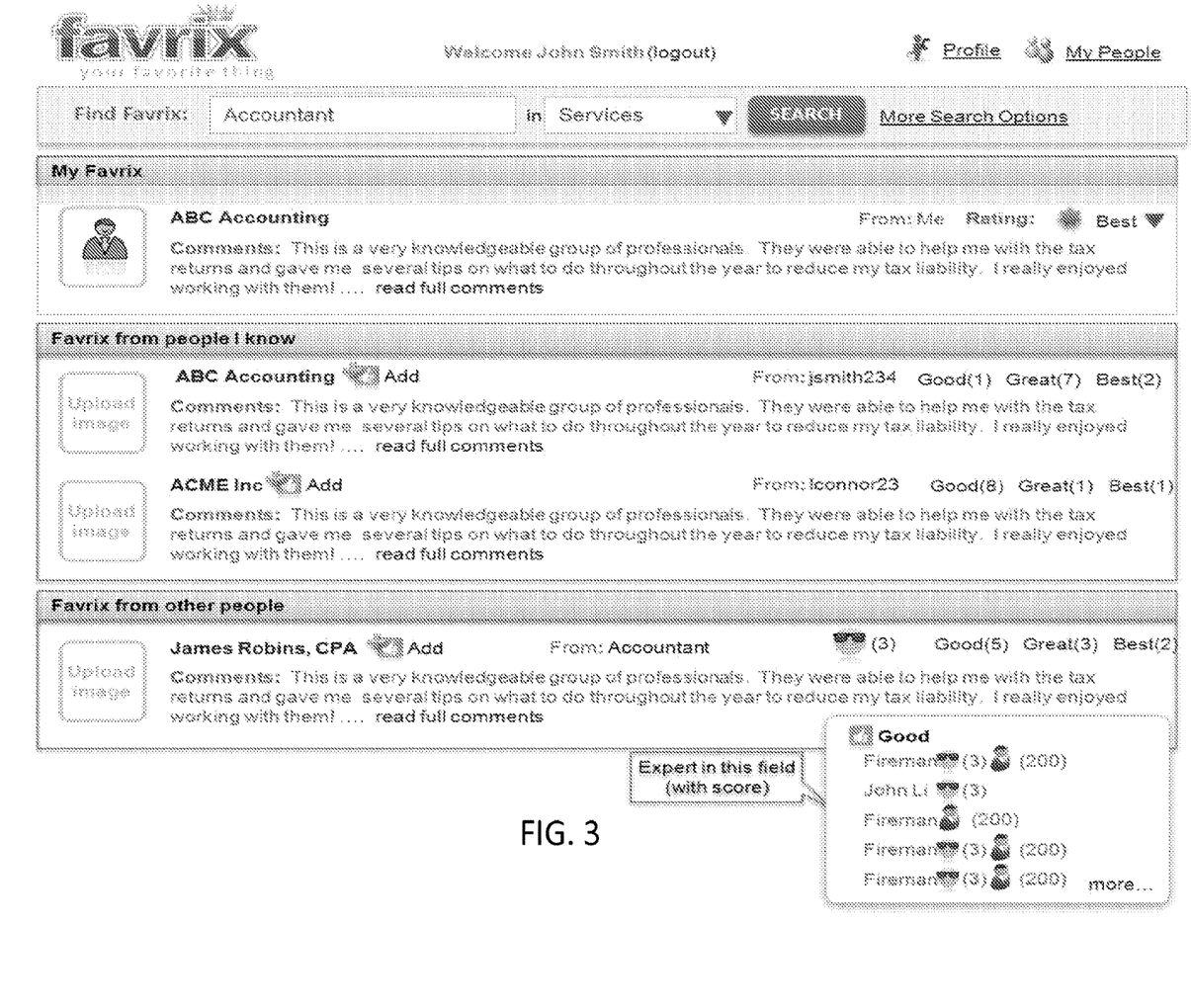
FIG. 3 is a sample search for an accounting service according to one embodiment of the invention.

FIG. 3 shows a sample search for an accounting service according to one embodiment of the invention. The results returned from the search are ordered such that first the item the user marked as favorite appear, then the items from users who the user classified as People I Know in the contact list appear, and then the results from other users. In this example the search did not find any items that the user's Friends or Business Contacts are added as their favorite items.

Interest Groups

In addition to the identified groups of contacts, user might join other groups of interest on the social network. In this case, when adding a new favorite item, the user may allow the users of the group be treated as members of the "My Friends" or any other user role just for this item.

There may be similarities in the favorite items of people with the same interests or sometimes the same country of birth or ethnic background. There are millions of immigrants living in many countries in the world including the United States. Those who grew up in other countries might have common favorite food, movies, or other favorite items. As part of their user profile, users could optionally specify their country or place of birth. Then using the advanced search, users can filter favorite items of the people of the same or a specific origin. In addition, businesses can provide information about languages that their employees who deal with customers can speak making the business products or services more attractive to those users who speak these specific languages.

User Relationship Roles (like Friend, Business Contact) and Interest Groups described above can be a Search Criteria in the search for a favorite item. For example, users would be able to search for favorite grocery stores among people born in Germany or search for a favorite wine of users born in Italy, etc.

Search Criteria: Advanced Search Capabilities

Advanced search capabilities allow users to further narrow down the search based on various Search Criteria. For example, it may be useful to search for a restaurant recommendation based on a favorite restaurant of the corporate executives in the area, or when looking for a present for a 14-year old, you may restrict the search to only items that 14-year olds consider "Cool".

Below is the list of the sample advanced search options:
1) By Category/Sub-category—searches for a favorite item of people with the selected category/sub-category.
2) By Occupation—searches for a favorite item of people with the selected profession/occupation
3) By Title/Position—searches for a favorite time of people with selected title/position
4) By Expert status—searches for a favorite item of people with the selected Expert status
5) "Cool" status—searches for a favorite item of people who achieved popular or "Cool" status as well as for items "Cool" people marked as "Cool".
6) Geographical Location—searches for a favorite item of people within specific geographical location.
7) Favorite @Business—searches for a favorite item within specific businesses. For example, searching for a favorite computer at Costco or Best Buy.
8) By Age Range—searches for a favorite item of people within specific age group.
9) By Social Group—search can be restricted to only show results of a specific group of users or an individual user.
10) By Price—searches for a favorite item within a specific price range.
11) By Country of Origin—searches for a favorite item of users with a specific place of birth or ethnic background.

Figure 4:
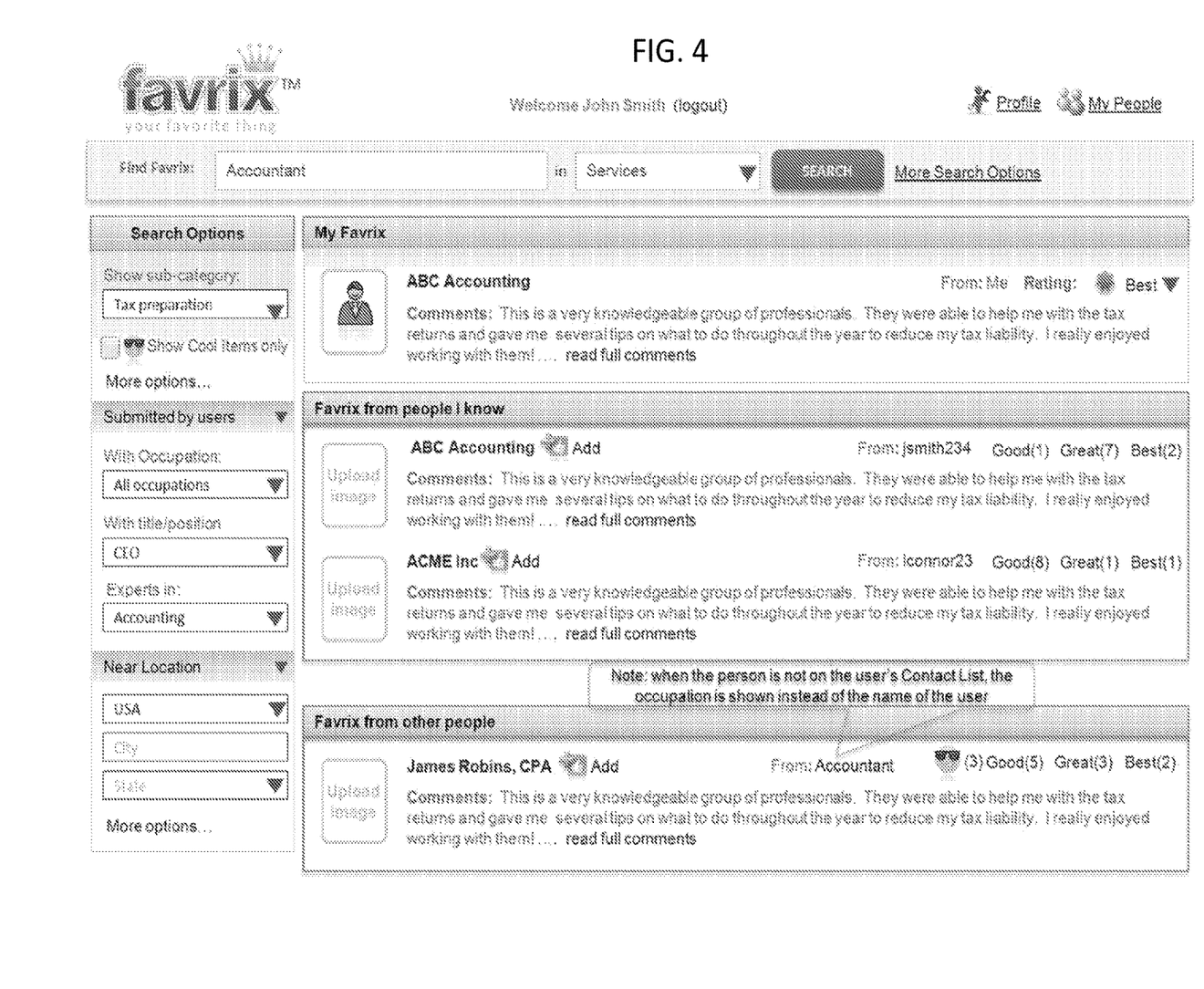
FIG. 4 is a sample search screen showing a search for an accountant with some advanced search options according to one embodiment of the invention.

FIG. 4 is a sample search screen showing a search for an accountant with some advanced search options according to one embodiment of the invention. In this example in addition to selecting the top level category of Services, the user also specified to restrict the search to only Tax Preparation services that are submitted by users with a job title of CEO who achieved an Expert Status in Accounting category in the United States.

Favorite Items at a Given Business

The system will allow businesses enhancing their marketing and advertising opportunities by creating a social network of people who value their products, engaging their customers at the point of sale to join the network, sharing the feedback of the people's favorite products and displaying higher ranking achievements awarded to the business based on number of people who list their products/services as their favorite.

Business Registration

Figure 5:
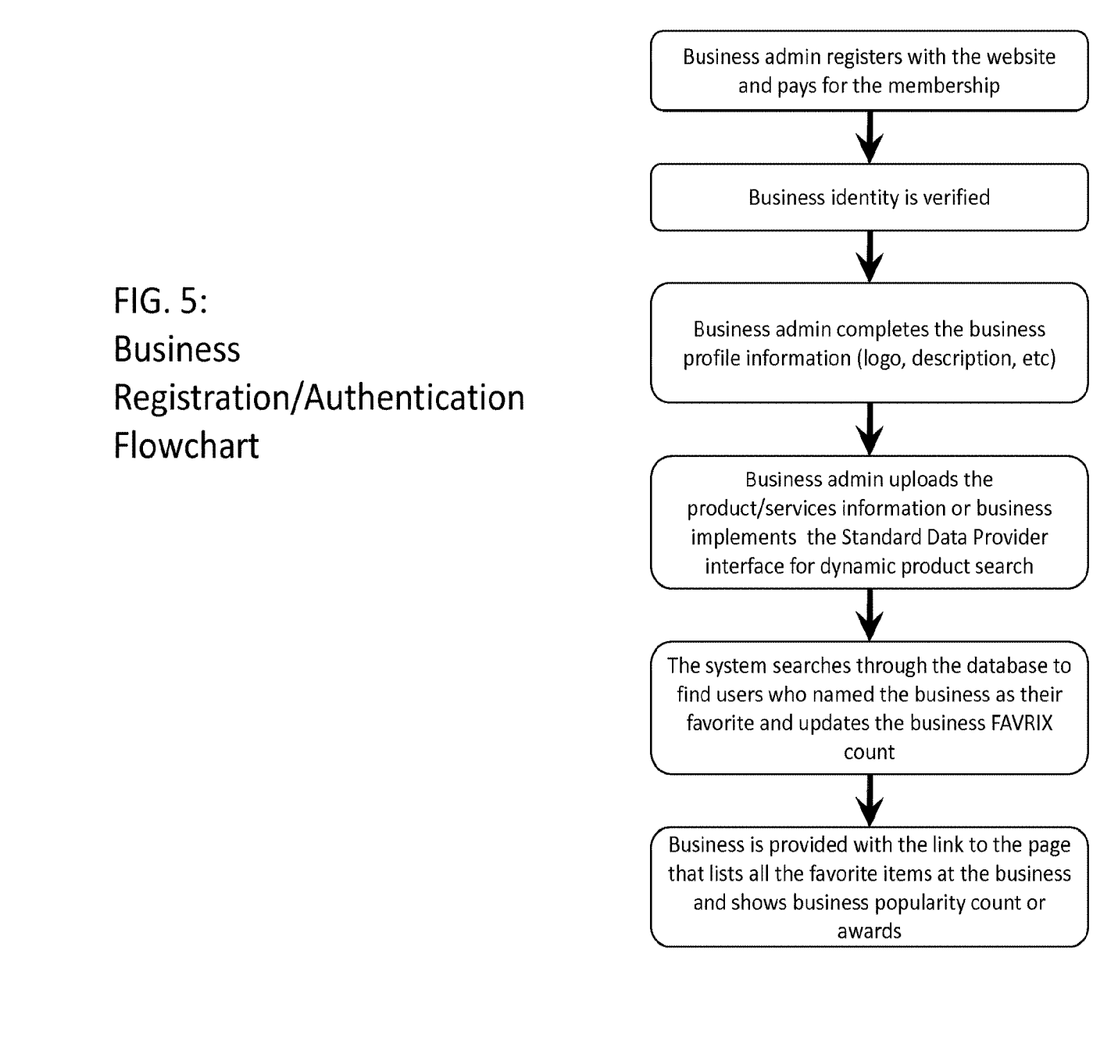
FIG. 5 is a business registration and setup flowchart according to one embodiment of the invention.

FIG. 5 is a business registration and setup flowchart according to one embodiment of the invention.

Upon registration with the website and payment of the membership fee (if applies) the business identity is verified. The verification process of the business identity may vary and may consist of a verification of the business information against the common business directories or a placement of a verification phone call to the number listed for the business in a public business directory. If the business identity is verified, a "verified" mark is displayed on the business page on the website.

After the successful verification, the business admin user can complete the business profile that will be viewable by the users of the site. The profile information may consist of the business name, description, business logo, and other applicable information and media.

Product Information Upload

Business admin user may upload information about the business products or services using a manual upload via a basic comma delimited file. The product/services file format is standardized and may contain the following information:
1) Product/Service Name
2) Product/Service Description
3) Product/Service Image
4) Product Identifier (i.e., model number, ISBN number, part number, etc.)

5) Price per unit
6) Purchase Link

Product upload file may also contain other relevant product/service data.

Querying Product/Services Information

Once the information is uploaded into the system's database, the product information will be available in the suggestion JQuery using the Internal Data Provider Interface (see Data Providers above). When the user searches for a specific product/service on the website, the product name may appear in the suggestion list as the user types in the name.

If the business has large number of products and/or if the products the business offers change frequently, the standard web service API Data Provider interface can be used (see Data Providers above). Business can implement the Standard Data Provider interface so that the product information will be dynamically queried by the system from the business website. The following is a sample set of methods that the web service may expose:

NameQuery(searchString)—this method is called from the search field when the user starts typing a product name. The method takes a partial or full search string as a parameter and should return the list names of the items that match the search string criteria.

GetItemList(searchString)—this method is called when results of the search are about to be displayed after the user types in a searchString in the search field. The returned XML data from the GetItemList( ) method is the list of items and their attributes described in the section above.

Purchasing Products/Services

The system provides functionality to sell products or services through the system website. There are three main interfaces used to achieve this functionality: 1) Purchase Link 2) Direct Purchase 3) Purchase Request.

Purchase Link is a URL to the purchasing page on the business' website provided by the business for the listed product. Purchase Link can be included as part of the business product/services upload as well as through the Standard Data Provider API. If no business registered with the system has a listing for the requested item, the system will perform a search on some of the well-known product websites (like amazon.com, buy.com, etc.).

Direct Purchase feature is offered to businesses that may not have an existing web-based payment gateway or would like to take advantage of listing their products on the systems website in addition to their own. To use Direct Purchase feature, the business registered with the system would need to setup the merchant account information that will be linked to the system's shopping cart. A fee may apply for this service.

Purchase Request feature will be available to any product or service business where the user will be directed to a webpage containing purchase request form specific for the selected business. The system provides a visual interface to customize the Purchase Request form to include specific information required for business to reply to this product or service request. For example, a heating and air-conditioning repair service business may ask a user to specify the type of equipment the user is requesting service on. Upon completion of the service request form, the information is sent to the business contact.

Displaying Product or Service Purchasing Information

When a user executes a search for a specific item, the search results may not include pricing information as those items are added by individuals as their favorites and may not be linked to a specific vendor. Once the user chooses to research the pricing information for a specific item listed in the search results, he/she may click on the "buy" link. The system will perform a query for the selected product against all the products added to the system database by various businesses as well as items linked to the system through the Standard Data Provider API. The resulting search will show pricing information as well as the rating score (good/great/best) for the given business. At this point the user will be able to choose the desired vendor for the product/service they are looking for. In the search results, businesses rated as favorite by other users connected to the user in the social network will have a higher listing.

Using the System at a Business

Businesses may facilitate the use of the system enhancing their marking opportunity by displaying signs with signup information for the FAVRIX™ system. Customers informed of the advantages of the FAVRIX™ system may sign up for the system at a home computer or businesses may have a computer at the business location connected to the Internet where customers may sign up. At a business location a dedicated member of staff may also sign up new customers on to the system as well as add specific favorite business products/service to their account on the system. FAVRIX™ rating can be displayed on the item label in the store or in the place of business providing immediate feedback to the consumer about the rating of the specific item or service. An example of a rating can be "Good (234) Great (89) Best (24)" where the numbers in the parenthesis represent the number of user's ratings of the given item in the specific category (good, great, or best).

Online Retailers

Online retailers may provide a link next to the product listing on their website that allow users add the selected item to their FAVRIX™ account. The link may also be displayed in the shopping cart and/or purchase confirmation page. The link consists of the name of the product, its identifier, may contain description and the link back to the Online Retailer website to display the product information. If users previously rated the item as good great or best, the corresponding rating will be displayed next to the item as well.

Follow Up Service

The system provides ability for businesses to setup automated follow up messages with customers who purchased a product or a service from the business and did not initially add this product/service to the list of their favorites. The follow up email can be automatically generated listing the items that were purchased and asking the user if any of these items became the customer's favorite. This service may be implemented by businesses that have proper database tracking systems in place that will allow generating the list of purchased items. This list would contain the user's e-mail address (the identifier on the System), the name, the date and a reference number on the System of the product purchased. The information is transmitted securely over the web to the System database. Based on the submitted information, the system can generate emails to the user after a certain period of time asking if they wish to add this item to their favorites.

Retail Store Interface

Retail businesses may extend the use of the system by providing a FAVRIX™ card to their customers. The FAVRIX™ card works similar to the purchase rewards cards implemented by many retail businesses. The difference is that the FAVRIX™ card is used to track items of the customer not only at the given business, but at all retailers and other businesses. This provides ability to have just one card that consumer may carry to track their items with all the vendors they purchase products or services from. Businesses that utilize the FAVRIX™ Card system would need to install the FAVRIX™ Card tracking software and item scanning device or install the FAVRIX™ Card software on their existing POS systems at the point of sale. Alternatively, the FAVRIX™ Retail Store Interface can be added to those businesses that utilize the purchase reward cards by customizing their existing tracking and POS software to include ability to link it to the FAVRIX™ system. The FAVRIX Card software enables communication between consumers at the point of sale and the online social networking, rating, blogging, search and other software systems. Information displayed and/or transmitted may include but not limited to positive, neutral or negative feedback, ratings, comments, or other information from the consumer or a business.

An example of the communication may the following:
1) Scanning the barcode of the desired item(s),
2) Selecting a rating using a touch screen or a by scanning a rating barcode (optionally leaving a comment)
3) Scanning the barcode form a Card or a Smartphone's display to finish the session and send the information to the web-based system.
NOTE: the steps described above and the action items may differ depending on the specific application.

Once the rating or other information has been submitted, the rating information is available online.

The rating and other information collected at the point of sale or on the website related to a specific item can be printed on the item label or on a separate label displayed at the store or the place of business. A batch process may be run periodically to reprint the labels so that the current information from the website is shown on the item label. This will allow users who do not have access to the internet getting additional relevant information about the item to facilitate a purchasing decision.

Sample Use of the System at a Retail Store

At a retail point of sale as the products customer is purchasing are scanned, the sales associate may offer the customer to add their new favorite items to their FAVRIX™ account. That is achieved by scanning the customer's FAVRIX™ card barcode using the FAVRIX™ provided (or the company's) barcode scanning device and then scanning those items that the customer identifies as their favorite. This information collected at the point of sale is transmitted to the System database via a Point of Sale Web Service API. Rating information can be immediately displayed on a monitor at the retail store that shows a live log of items being added. This will facilitate advertising efforts of the items sold and rated at the retail store. In addition, item labels with the rating information can be printed periodically to feature the rating of the item. The rating can be printed on a separate label or as part of the item label and include the rating information for example "Good (34) Great(25) Best (12) Cool(8) Want it (36)". In this example the label means that 34 people rated the item as "Good", 25 people rated it as "Great", 12 people rated it as Best, 8 people who earned the status of "Cool" rated this product as "Cool" and 36 people listed that they want to have this item. In addition to the item labels, the items with the highest number of ratings can be shown on a monitor inside the store or the place of business. Top rated items can be displayed by category making it easy for consumers to make a buying decision on a specific item. By using the FAVRIX Card and the labeling/display features at the place of business allows consumers that do not have access to the internet to take advantage of the system. An online FAVRIX account is established automatically by enabling the FAVRIX Card at the point of sale. Consumers may never login into their account but still will be able to rate items and see the ratings on the labels in the store as well as lookup their items using their FAVRIX Card on the computer connected to a barcode scanner located at place of business. To login into their FAVRIX account the user may use their login credentials or simply scan the FAVRIX Card using the barcode scanner connected to the computer. The barcode from the FAVRIX card is used to identify and log the user into the system.

Other Social Networking Features of the System for the Business

In addition to displaying the business name, logo, description and uploading product/services information, the business may take advantage of social networking capabilities of the system. One of these features is ability to list employees that directly communicate with the customers on the FAVRIX™ at business web page. When users browse to that page, they are able to select those employees they had pleasant buying experience with as their favorite employees at that business. This will allow managers and business executives to have a better idea of their employee's ability to deal with customers as well as encourage employees to perform better.

Businesses may provide a public computer for customers to use to lookup favorite items of the users in their social network as well as other customers of that business. Favorite items of the day maybe featured on large screen displays (if present) or as a sign or a printout displayed at the business location.

Subscription to Favorite Items Feed

Users may choose to be notified of the items other members of their social network add as favorite by subscribing to the Favorite Items Feed. The feed would include the name and category of the item, any comments that the users might accompany the favorite item with as well as the date/time of the post. It may also include a "Buy" button for those items that can be purchased. The feed functionality is achieved by recording every addition of the favorite item by users in a logging table in the database. Then a query is executed to select those items added by members of the user's social network. The feed can be limited to just items added by a specific group or multiple groups of users connected to the given user.

Advertising Opportunities on the System Website

The system offers various levels of advertising opportunities for vendors. The following is a summary of the advertising offerings that can be utilized though the system:
1) Generic Advertising—an advertising banner can be placed in a specific location on the site for a specific period of time and/or specific number of user views.
2) Content-driven advertising—when user is searching for a specific item or a category, a content-specific advertising is displayed.
3) Item-based advertising—as part of the display of every item in the system there is a buy/purchase link that users can click on to view the list of companies who provide this item or service and associated price information if available. Advertisers can add the items they sell to the system database or provide the querying ability into their database using the Data Provider API described above.
4) Feed-based advertising—users receiving the Favorite Items Feed (see above) may be presented with a "Buy" link next to the item one of the members of their social network added as their favorite and is shown in the feed. Advertising on the page can be tied to the item added as favorite. In addition, a "buy" button next to the item can take the user to the list of sites where the item can be purchased. Advertisers that carry this specific item will be listed at the top of the list. The system will compile the list buy running a query in the database for the selected item or by using the Data Provider API and dynamically querying the information from the advertiser's website.
5) Expert/Popularity-related advertising—users that achieved a high popularity or an expert level can be influential in one's decision to purchase a specific item. Advertisers will have an option to display the list of experts or popular users who consider their business or the specific product or service their business provides as their favorite. In addition, when users search for a specific item and the item recommended by the expert or a popular user is displayed, the buy link for that item can link directly to the advertiser's website purchase page. Popular or Expert users will have an opportunity to get paid for allowing the businesses use their opinion in advertising efforts. In this case, the identity of the popular or expert user must be verified to avoid false impersonations. Identity can be verified by getting credit card, bank information or PayPal information from the user. This information would confirm the user identity. Other verification methods can be employed as well. Popular and/or expert users will have to approve ability of the advertiser mentioning their name and agree with the terms and the compensation provided by the advertiser.

System Deployment on Mobile Devices

The system can be accessed by the mobile devices like smart phones, PDAs, or Internet capable phones, etc. If the system is accessed by a handheld device which is able to store information in the local memory, an option is available for the user to record the favorite items of the users connected to him/her right on the mobile device. This allows disconnected search functionality within the system among the favorite items of the user's immediate contacts without having to be connected to the Internet. In the mobile device is connected to the internet, the user may use the built-in web browser or the FAVRIX Application for Mobile Devices (FAVRIX Mobile) to perform lookups and searches using the Search Criteria similar to how it is done using a computer web-browser. FAVRIX Mobile app allows provides additional functionality to the user by using a built-in Smartphone's camera a barcode scanner to scan items. This allows users to quickly look up a specific item on FAVRIX or add an item to their list of favorites by just scanning the item's barcode using the Smartphone. FAVRIX Mobile app also allows users to add new items manually as well as use the Smartphone's camera to take a picture of the item and sent it to FAVRIX such that it will be displayed next time any user looks up this item.

Integration into Other Social Networking Sites

The system may be integrated with other social networking sites to provide the ability to track favorite items and search for recommendations from the other members of the social network connected to the user. This is accomplished by using the specific APIs and or scripting languages provided by the social network sites to create custom applications embedded into the given social network site. The system also allows single sign-on capability and compatibility with various standard user authentication gateways like Open ID, etc.

Systems Embodying the Present Invention

Embodiments of the present invention can be implemented in any type of suitable computer system and computer network, including computer networks that utilize the Internet or other distributed computing system. Such a computer system in such a network may include computer circuitry 602 containing suitable memory device. The computer circuitry is typically connected through address, data, and control buses to the memory devices to provide for writing data to and reading data from the memory devices. The computer circuitry includes circuitry for performing various computing functions, such as executing specific software to perform specific calculations or tasks. In addition, the computer system includes one or more input devices, such as a keyboard or a mouse, connected to the computer circuitry to allow an operator to interface with the computer system. Typically, the computer system also includes one or more output devices connected to the computer circuitry, such output devices typically including a printer and a video display. One or more data storage devices are also typically connected to the computer circuitry to store data or retrieve data from external storage media. Examples of typical storage devices 608 include magnetic disks, tape cassettes, compact disk read-only (CD-ROMs) and compact disk read-write (CD-RW) memories, and digital video disks (DVDs), FLASH memory, and so on. Such computer systems may be personal computer systems, mobile devices like cell phones and personal digital assistants, netbook computers, and so on, connected to a suitable computer network or networks which, as already mentioned, may include the Internet.

What is claimed is:
1. A computer method of providing recommendations for items on a social networking website comprising a plurality of individual members and business members, the method comprising:
   allowing, by a computer, individual members of the social networking website to select items of business mem- bers to be identified as their favorite item, the items comprising a product or a service in a specific category and/or subcategory;

allowing, by a computer, the individual members to assign to each of the selected items only one of a plurality of positive ratings and to input a positive comment comprising good, great, and greatest labels, or good, great and best labels, while excluding a negative rating and a negative comment;

allowing, by a computer, each individual member to associate other individual members of the social networking website with the individual member;

allowing, by a computer, individual members of the social networking website to search for the favorite items of other individual members in a specific category and/or subcategory;

wherein the search results display business members selling the item entered by at least one of the other individual members, and a total number of the positive ratings, and the positive comments; and receiving, by a computer, individual members' input for assigning an expert status in a category and/or a subcategory to an individual member when a minimum number of the other individual members associated with the individual member accept that the individual member is an expert in the specific category and/or subcategory;

wherein the computer system collects information on individual members' favorite items from the business member's social networking website and from the websites of other competing businesses members on the social networking website, and generates a market research report listing a count and identity of all the favorite items of each business member, and the computer transmits the market research report to the business members.

2. The computer method of claim 1, further comprising: assigning, by the computer, a popularity status to an individual member when a minimum number of the other individual members associated with the individual member indicate the individual member should be assigned this popularity status.

3. The computer method of claim 2, further comprising: assigning, by the computer, the popularity status to items that the individual member marks with the popularity status.

4. The computer method of claim 3, further comprising: processing, by the computer, search queries from individual members, the search queries including the popularity and expert statuses as criteria of these search queries.

5. The computer method of claim 1, further comprising:
receiving, by a computer, an individual member input for assigning a privacy setting to each favorite item of the individual member;
processing, by a computer, search queries from the individual members for one of the favorite items of the individual members;
filtering and transmitting, by a computer, the results of these search queries for the favorite item as a function of the privacy setting of the favorite item, comprising private, business contacts, friends, people I know, and everyone; and
wherein a setting of a private prevents anyone other than the individual member from viewing the individual member's private favorite items.

6. The computer method of claim 5, further comprising: assigning, by a computer, a picture or a name with each individual member;

assigning, by a computer, for each individual member associated with a given member interest groups and/or communities to thereby place each member associated with the given member into one or more such interest groups and/or communities;
processing, by a computer, search queries from the individual members for one of the favorite items of the given member in an interest group and/or community; and
filtering and transmitting, by a computer, the results of these search queries for the favorite item as a function of the interest groups and/or communities each individual member is assigned to.

7. The computer method of claim 6, wherein the operation of filtering further comprises either showing or blocking, by a computer, the visibility of the picture or name of the given individual member as a function of the interest groups and/or communities assigned to the individual member.

8. The computer method of claim 1, wherein each favorite item of the individual member may be marked, by a computer, with an "I want it" label such that when members associated with the individual member perform searches on favorite items of the individual member, then the "I want it" label will be displayed for favorite items so marked.

9. The computer method of claim 1, further comprising:
assigning, by a computer, for each member associated with a given individual member, one or more user relationships, wherein the user relationships include the categories Friends and Business;
processing, by a computer, search queries from a given individual member for favorite items of other individual members of the social networking website; and
providing, by a computer, the search results of the search queries by first listing favorite items of other individual members assigned to the Friends category and then listing favorite items of other individual members assigned to the Business category.

10. The computer method of claim 9, wherein providing the search results further comprises, after listing the results of the Friends and Business categories, then listing, by a computer, the search results of the favorite items of members of the social network that are not associated with the other individual members of the given individual member.

11. The computer method of claim 9, wherein the search results can further be listed, by a computer, based on whether the searched favorite item has been designated as a favorite item by an individual member that has been designated as an expert in a category assigned to the searched favorite item.

12. The computer method of claim 11, wherein the search results can further be listed, by a computer, based on whether the searched favorite item is designated as a favorite item of an individual member having a specific occupation and/or geographical location associated with that member.

13. The computer method of claim 1, wherein the market research report results are broken down by one or more of the individual members': age, occupation, popularity, and expert status.

14. A system for providing recommendations for items through a social networking website comprising a plurality of individual members and business members, the system comprising:
a computer system for providing the social networking website, the computer system operable to,
enable individual members of the social networking website to select items that will be identified as their favorite items comprising a product or a service in a specific category and/or subcategory;

enable the individual members to assign to each of the selected items only a respective one of a plurality of positive ratings, and to input a positive comment comprising good, great, and greatest labels, or good, great and best labels, while excluding a negative rating and a negative comment;

enable each individual member to associate other individual members of the social networking website with the individual member;

enable individual members of the social networking website to search for an item to purchase, wherein the search results display business members selling the item, and a total number of the positive ratings, and/or the positive comments from the other members; and wherein the computer system may collect information on individual members' favorite items from the business member's social networking website and from the websites of other competing businesses members on the social networking website, and generate a market research report listing a count and identity of all the favorite items of each business member, and the computer transmits the market research report to the business members.

15. The system of claim 14, wherein each member may utilize a smart phone or other Internet-capable device to access the computer system through which the social networking website is provided.

16. The system of claim 15, wherein an individual member can store favorite items of the individual member in local storage of the smart phone so that the individual member can perform a search on those items without an Internet or other network connection to the computer system.

17. The system of claim 15, wherein the individual member can utilize the smart phone to scan a barcode of an item to add the item as a favorite item of the individual member.

18. The system of claim 14, wherein a business member of the social networking website can upload a list of products and/or services that it provides such that these products and/or services will be accessible through search queries by individual members searching for items to add to their favorite items.

19. The system of claim 18, wherein the business member may receive an award to display at their place of business and on their social networking and public website when they have at least a minimum number of individual members designate the business member and/or some of the business's products and/or services as their favorite items.

20. The system of claim 19, wherein the business member can display a webpage provided by the system on their business social networking website where individual member customers of the business can view and choose favorite products or services that the business provides.

21. The system of claim 20, wherein the products or services of the business member that are designated as favorites of the individual member customers are displayed at the physical location of the business with labels displaying the total number of positive ratings.

22. The system of claim 14, wherein the business member may include employee information on the business social networking website and the employees may be voted for as favorite employees by the individual member customers of the business member.

23. The system of claim 14, wherein each favorite item added to the business social networking website by a business's individual member customer triggers an advertisement presented to the business's customer, and wherein the content of the advertisement is based on the item the business's customer is adding to the business website; and wherein when an individual member searches for a product or service, a search result will list advertisements for favorite products and services posted by business members and an identification of one or more experts who recommended the product or service.

24. The system of claim 14, wherein a unique identifier comprising a card with a barcode, or a barcode image stored on a Smartphone, is used at a place of business or organization to identify individual members and to enable them to positively rate, and leave positive comments about the business members' products or services on the social networking website.

25. The system of claim 14, wherein the market research report results are broken down by one or more of the individual members': age, occupation, popularity, and expert status.

26. A computer method of providing recommendations for items through a social networking website comprising a plurality of individual members and business members, the method comprising:

facilitating, by a computer, the selection of items that will be identified as favorite items of individual members of the social networking website in a specific category and/or subcategory;

facilitating, by a computer, the individual members to assign to each of the selected items only one of a plurality of positive ratings comprising good, great, and greatest labels, or good, great and best labels, while excluding a negative rating;

facilitating, by a computer, for each individual member to associate other individual members of the social networking website with the individual member;

facilitating, by a computer, searching queries by the individual members of the social networking website to search a category and/or subcategory for the favorite items of other individual members;

wherein the search queries include an expert status of an individual member as criteria of these search queries;

wherein an individual member is assigned the expert status when a minimum number of the other individual members associated with that individual member accept that the individual member is popular or an expert in the category and/or the subcategory, and their expert status is determined by their occupation and/or job title that is stored in the individual member profile; and wherein the computer system may collect information on individual members' favorite items from the business member's social networking website and from the websites of other competing businesses on the social networking website, and generate a market research report listing a count and identity of all the favorite items of each business member, and the computer transmits the market research report to the business members.

* * * * *